United States Patent
Kleine et al.

(10) Patent No.: US 11,027,327 B2
(45) Date of Patent: Jun. 8, 2021

(54) METHOD AND APPARATUS FOR PRODUCING A CONNECTING ELEMENT

(71) Applicant: Mac Panther Gmbh, Bremen (DE)

(72) Inventors: Michael Kleine, Achim (DE); Andreas Kleine, Bremen (DE)

(73) Assignee: MAC PANTHER GMBH

( * ) Notice: Subject to any disclaimer, the term of this patent is extended or adjusted under 35 U.S.C. 154(b) by 0 days.

(21) Appl. No.: 16/657,128

(22) Filed: Oct. 18, 2019

(65) Prior Publication Data
US 2020/0122218 A1    Apr. 23, 2020

(30) Foreign Application Priority Data

Oct. 19, 2018   (DE) .......................... 102018126093.8

(51) Int. Cl.
*B21K 5/10*     (2006.01)
*B21D 39/04*    (2006.01)
(Continued)

(52) U.S. Cl.
CPC ................ *B21K 5/10* (2013.01); *B21D 39/04* (2013.01); *B21J 5/12* (2013.01)

(58) Field of Classification Search
CPC ..... B21J 5/12; B21J 7/145; B21J 9/027; B21J 13/025; B21K 5/10; B21D 39/04; B23P 15/32
See application file for complete search history.

(56) References Cited

U.S. PATENT DOCUMENTS

| | | | |
|---|---|---|---|
| 2,405,298 A | 8/1946 | Fleischer | |
| 4,389,870 A * | 6/1983 | Boeni | B21J 5/12 72/354.2 |
| 2011/0290079 A1 | 12/2011 | Schuetz et al. | |

FOREIGN PATENT DOCUMENTS

| | | |
|---|---|---|
| DE | 3015893 | 10/1981 |
| DE | 19915303 | 10/1999 |

(Continued)

OTHER PUBLICATIONS

U.S. Appl. No. 16/657,081, filed Oct. 18, 2019 and entitled "Connecting Element, Method and Apparatus For Its Production".

(Continued)

*Primary Examiner* — Bayan Salone
(74) *Attorney, Agent, or Firm* — Merek, Blackmon & Voorhees, LLC (57) ABSTRACT

The invention relates to a method and an apparatus for producing a rod- or pipe-shaped intermediate product provided with an end face (106) from a semi-finished connecting element (102) made of metal, in particular an insertion end of a drill or chisel attached in an axially movable manner in the chuck of a hammer drill, the connecting element (100') having at least one rotary entrainment surface (162, 164) and at least one locking depression (122, 124), the locking depression (122, 124) being preferably embodied as a locking groove, a semi-finished connecting element (102) being provided, the at least one rotary entrainment surface (162, 164) being formed in the semi-finished connecting element (102) by axially forcing the semi-finished connecting element (102) in the direction of the longitudinal axis (136) of the semi-finished connecting element (102) into a longitudinal die opening (204) of a die (202), or being embossed in the semi-finished connecting element (102) by radially applying at least one movable forming body (206), and the at least one locking depression (122, 124) being embossed by radially applying at least one or multiple forming bodies (206) that are movable in the same die (202).

11 Claims, 6 Drawing Sheets

(51) Int. Cl.
*B21J 5/12* (2006.01)
*B21J 9/02* (2006.01)
*B21J 13/02* (2006.01)
*B21J 7/14* (2006.01)
*B23P 15/32* (2006.01)
*B23B 51/00* (2006.01)

(56) References Cited

FOREIGN PATENT DOCUMENTS

| | | | | |
|---|---|---|---|---|
| DE | 19859885 | 11/1999 | | |
| DE | 102010014477 | 10/2011 | | |
| DE | 102010018791 | 11/2011 | | |
| DE | 102010028474 | 11/2011 | | |
| EP | 2361702 | 8/2011 | | |
| EP | 2458131 | 5/2012 | | |
| EP | 2641673 | 9/2013 | | |
| EP | 2839900 | 2/2015 | | |
| GB | 631438 | 11/1949 | | |
| GB | 631438 A | * 11/1949 | ............. | B21J 7/145 |
| WO | WO-2011137021 A1 | * 11/2011 | ............. | B21K 5/10 |

OTHER PUBLICATIONS

German Search Report dated Jul. 29, 2019 issued in DE 102018126086.5, seven pages.
German Search Report dated Jul. 8, 2019 issued in DE 102018126093.8, eight pages.
European Search Report dated Mar. 13, 2020 issued in connection with European Application No. 19198941.7, six pages.
European Search Report dated Mar. 23, 2020 issued in connection with European Application No. 19198953.2, eight pages.

* cited by examiner

FIG. 1

DETAIL A
SCALE 2:1  FIG. 4

FIG. 2

CROSS SECTION C-C FIG. 6
SCALE 2:1

CROSS SECTION B-B
SCALE 2:1  FIG. 7

METHOD AND APPARATUS FOR PRODUCING A CONNECTING ELEMENT

RELATED APPLICATION

The subject patent application claims priority under 35 USC § 119 from German application DE 102018126093.8 filed on Oct. 19, 2018. The entire contents of German application DE 102018126093.8 is incorporated herein by reference.

The invention relates to a method for producing a rod- or pipe-shaped connecting element provided with an end face and made from a metal semi-finished connecting element, in particular a drill or chisel insertion end secured in an axially movable manner in a chuck of a hammer drill. The invention further relates to such a connecting element or an apparatus for producing a connecting element made from a metal semi-finished connecting element, in particular a drill or chisel insertion end secured in an axially movable manner in a chuck of a hammer drill.

Methods and apparatuses of the type initially mentioned are known from the prior art. For example, EP 2 458 131 A2, EP 2 361 702 A1, and EP 2 839 900 A1 show methods and apparatuses of the type initially mentioned.

A task of the present invention is to improve methods and/or apparatuses of the type initially mentioned.

This task is solved by the subject of the independent method claim 1 and/or, respectively, by the subject of the independent apparatus claim 7.

The present invention comprises the recognition that the methods known from the initially mentioned prior art for forming rotary entrainment surfaces and locking grooves in semi-finished connecting elements, in particular in drills, always require multiple dies for performing the method. This means that for performing the method known from the prior art, expensive multi-step presses are necessary. This results in increased costs during production of the connecting elements in question. In addition, multi-step presses are narrowly limited regarding the lengths and diameters of the parts they can process so that many drill or chisel dimensions cannot be produced on them.

In addition, the invention has also recognized that in the methods and apparatuses of the prior art mentioned initially, the semi-finished connecting element and/or work piece can easily twist during the transport from one die to the next. This results, during insertion into the subsequent die, in breakage with a resulting long machine downtime and above all, in the destruction of the forming tools used in the machines. These disadvantages in particular are avoided in particular by production according to the invention of the rotary entrainment surfaces and the locking grooves in just a single die.

A preferred embodiment of the invention is characterized in that the locking depression is embodied as a locking groove. By means of a locking groove additional torque can be transmitted.

A preferred embodiment of the invention is characterized in that the embossing of the at least one or multiple locking depressions in the semi-finished connecting element is performed by radially applying one or multiple forming bodies, that are movable in the die, subsequent to and/or during the forming of the one or multiple rotary entrainment surfaces. In particular, by means of the forming of the rotary entrainment surfaces as rotary entrainment grooves, the semi-finished connecting element is positioned in the die in a more non-rotatable manner than when the locking depressions are formed first. This guarantees that the die is not damaged by twisted parts.

A preferred embodiment of the invention is characterized in that in a pipe-shaped semi-finished connecting element having an interior pipe diameter in the area of the at least one planned rotary entrainment surface and the at least one planned locking depression, the pipe diameter is reduced or closed by inserting the at least one planned rotary entrainment surface and/or the at least one planned locking groove. Preferably, the interior pipe diameter is reduced or closed by the prior insertion of an interior pin profiled along its longitudinal axis by changes in its cross-section in the semi-finished connecting element, the interior pin preferably being of greater strength than the pipe.

In this context, the invention has recognized that pipe-shaped connecting elements having an interior cavity in the pipe with an interior pipe diameter are primarily used to produce hollow drill bits. Such hollow drill bits are preferably produced from solid steel rods. The interior cavity in the pipe with an interior pipe diameter, which creates the actual hollow bore, is preferably created by drilling deep holes. In this context, the invention has recognized that this drilling of deep holes is not only very expensive, but that it also has disadvantages in terms of quality due to the frequently occurring scoring at the bottom of the borehole. This frequently results in scrap, so that the price of hollow drill bits produced in this manner is very high, which is an obstacle to the general spread of such hollow drill bits. Using, according to the invention, a pipe-shaped semi-finished connecting element, e.g., a preferably thick-walled pipe section, avoids these disadvantages according to the invention. In particular, in this embodiment of the invention, preferably the rear end of the drill is closed off, so that the impact energy can be transmitted to this solid rear end and at the same time, the extraction process with a hollow drill bit produced according to this embodiment continues to take place, as is also known in hollow drill bits known from the prior art, upstream from the insertion end.

A preferred embodiment of the invention is characterized by the fact that the die is divided at least once in the longitudinal direction and the halves or parts of the die have a small distance from each other relative to the diameter of the connecting elements during ejection. The advantages of this embodiment lie, in particular, in the fact that, due to the slight, i.e. small relative to a diameter of a connecting element, distance between the die halves created by dividing the die in its longitudinal direction, the forces required for expelling the connecting element from the die are considerably reduced.

The present invention also claims protection for a semi-finished connecting element, in particular a drill or chisel semi-finished product having at least one rotary entrainment surface and at least one locking depression, the semi-finished connecting element being produced by means of a method according to the invention, in particular by means of a method according to the invention according to one of the preferred embodiments described above.

The invention further claims protection for a connecting element, in particular for a drill or chisel having rotary entrainment surfaces and locking depressions, the connecting element being produced by means of a method according to the invention, in particular by means of a method according to the invention according to one of the preferred embodiments described above.

A preferred embodiment of the production apparatus according to the invention is characterized in that outside of the die and approximately perpendicular to the longitudinal die opening, at least one wedge is arranged that presses upon the at least one radially movable forming body for embossing the locking grooves and/or rotary entrainment surfaces. An advantage of this preferred arrangement of the wedges lies, in particular, in the fact that this enables a particularly compact execution of the apparatus according to the invention.

Another preferred embodiment of the apparatus according to the invention is characterized by the fact that the at least one wedge is arranged as an interior cam surface within a bushing rotatably supported concentrically to the die, and that, by turning the bushing, the force for forming the locking grooves and/or rotary entrainment surfaces is applied to the at least one radially movable forming body. An advantage of this preferred embodiment of the apparatus according to the invention lies in particular in the fact that that this arrangement of the bushing rotatably supported concentrically to the die enables a particularly compact execution of the apparatus according to the invention.

Additional preferred embodiments of the invention are listed in the dependent claims.

Below, preferred embodiments of the invention are described based on the drawings. Parts or method steps that are identical or have identical functions are identified by the same reference symbols. The drawings show the following.

Figure 1:
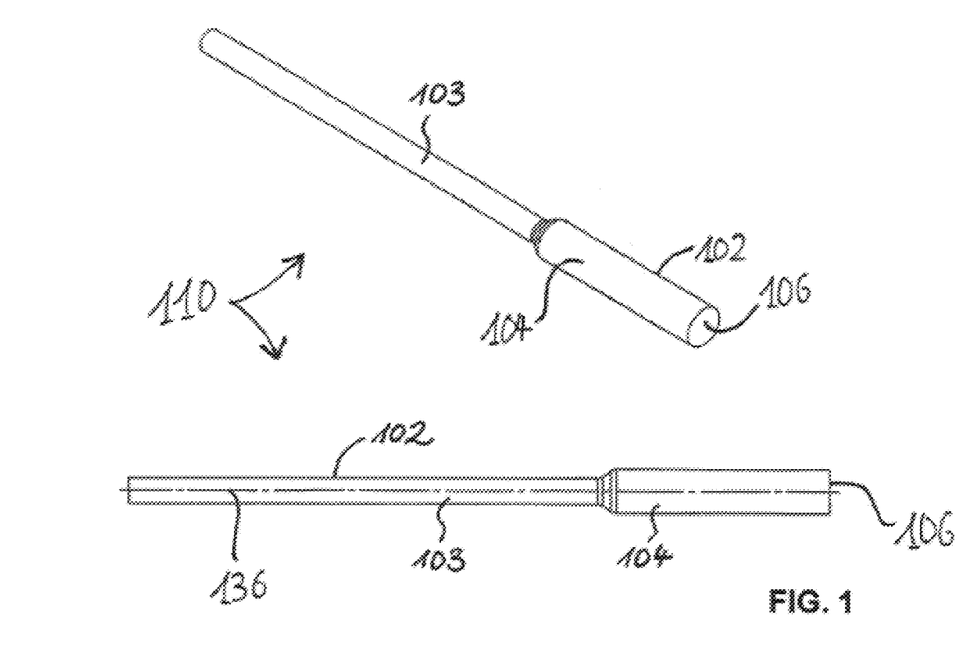
FIG. 1 shows a semi-finished connecting element for use in the methods and/or apparatuses according to the invention in a perspective view and a side view.
Figure 14:
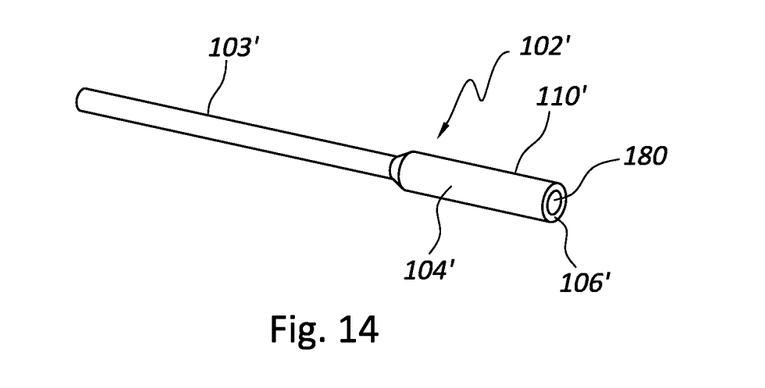
FIG. 14 shows a pipe-shaped semi-finished connecting element for use in the methods and/or apparatuses according to the invention in a perspective view.

FIG. 1 shows a semi-finished connecting element 102 for use in the methods and/or apparatuses according to the invention in a perspective view and in a side view. The semi-finished connecting element 102 shown in FIG. 1 is made of metal. The semi-finished connecting element 102 is overall embodied as a cylindrical rod. Alternatively, as shown in FIG. 14, the semi-finished connecting element can be a cylindrical pipe-shaped connecting element 102' having a hollow interior cavity 180 extending the length or substantially the length of connecting element 102'. The semi-finished product 102 has a section 103 having a smaller diameter, always shown on the left in FIG. 1, and a section 104, always shown on the right in FIG. 1, which has, when compared to the diameter of the section 103, a diameter that is roughly twice as large, the difference in diameters between the sections 103 and 104 being irrelevant for the present invention. In addition, the semi-finished product 102 has at its side facing away from the thinner section 103 an end face 106. FIG. 1 shows the raw state 110 of the semi-finished product 102 before the embossing of a longitudinal groove or a rotary entrainment surface in the section 104. The dashed line 136 visible in FIG. 1 in the side view of the semi-finished product 102 shows the longitudinal axis of the semi-finished product 102.

The semi-finished product 102', as shown in FIG. 14, has a section 103' having a smaller diameter, always shown on the left in FIG. 14, and a section 104', always shown on the right in FIG. 14, which has, when compared to the diameter of the section 103', a diameter that is roughly twice as large, wherein the difference in diameters between the sections 103' and 104' are irrelevant for the present invention. In addition, the semi-finished product 102' has at its side facing away from the thinner section 103' an end face 106'. FIG. 14 shows the raw state 110' of the semi-finished product 102' before the embossing of a longitudinal groove or a rotary entrainment surface in the section 104' using any of the methods or apparatuses described herein.

The semi-finished connecting element 102' of FIG. 14 is embodied as a pipe-shaped semi-finished product. An interior pipe cavity 180 with a desired interior pipe diameter which extends concentrically with the longitudinal axis of element 102' can be found in the semi-finished product 102'. Such semi-finished products are used, e.g., in hollow drill bits.

Figures 2, 4:
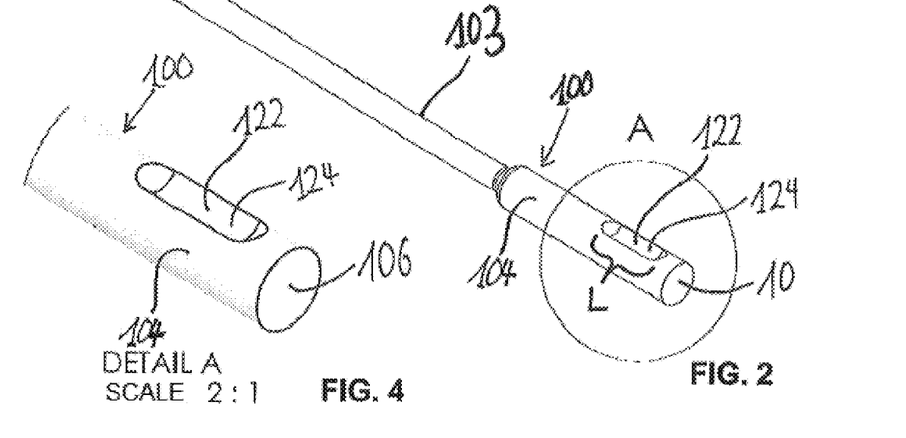
FIG. 2 shows a perspective view of an intermediate product after a first work step of a first embodiment of a method according to the invention.
FIG. 4 shows the detail view A of FIG. 2.

FIG. 2 shows a perspective view of an intermediate product 100 after a first work step of a first embodiment of a method according to the invention. In the area of the section 104, FIG. 2 shows a metal rod-shaped intermediate product 100 made of the semi-finished connecting element 102 of FIG. 1 and provided with an end face 106. The embodiment of the intermediate product 100 according to the invention shown in FIG. 2 represents a drill or chisel insertion end secured in an axially movable manner in a chuck of a hammer drill. The intermediate product 100, which is described in more detail with reference to FIGS. 4-7, has two longitudinal grooves closed on both sides 122 across from each other on the circumference of the section 104. The longitudinal grooves 122 have a planned length L. In the embodiment shown, the longitudinal grooves 122 serve as the locking grooves 124.

Figure 3:
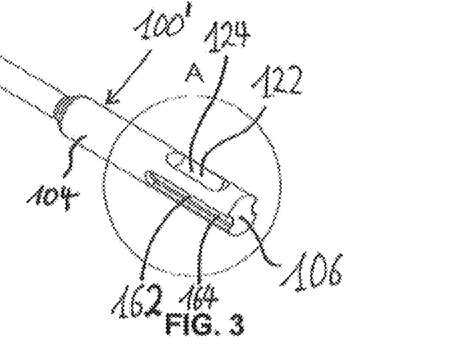
FIG. 3 shows a perspective view of a connecting element after a second work step of a first embodiment of a method according to the invention.

FIG. 3 shows a perspective view of an embodiment of a connecting element 100' after a second work step of a first embodiment of a method according to the invention. The embodiment of a connecting element 100' shown in FIG. 3 is described in more detail below with reference to FIGS. 8-11. The essential difference between the connecting element 100' and the intermediate product 100 of FIGS. 2 and 4-7 is that two rotary entrainment surfaces 164—separated by a right angle from the longitudinal grooves 122 along the circumferential direction of the circumference of the section 104—rotary entrainment surfaces also located on the circumference of the section 104 across from each other, which are open towards the end face 106, embodied essentially as U-shaped grooves 162 in the depicted embodiment of FIGS. 3 and 8-11, are formed and/or embossed.

FIG. 4 shows the detail view A of FIG. 2.

Figure 5:
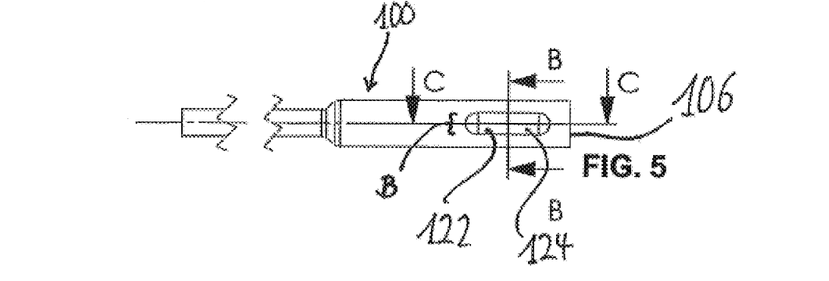
FIG. 5 shows a partial top view of the intermediate product of FIG. 2.

FIG. 5 shows a top view of the intermediate product 100 of FIG. 2.

Figure 6:
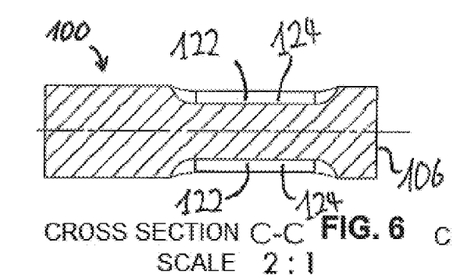
FIG. 6 shows a sectional view according to the sectional line C-C shown in FIG. 5.

FIG. 6 shows a sectional view of the intermediate product 100 according to the sectional line C-C shown in FIG. 5.

Figure 7:
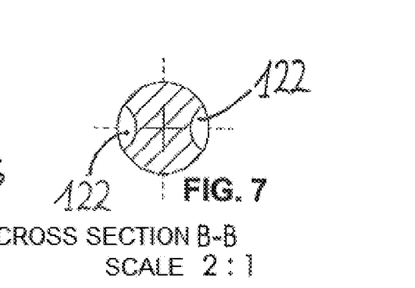
FIG. 7 shows a sectional view according to the sectional line B-B shown in FIG. 5.

FIG. 7 shows a sectional view of the intermediate product 100 according to the sectional line B-B shown in FIG. 5.

Figure 8:
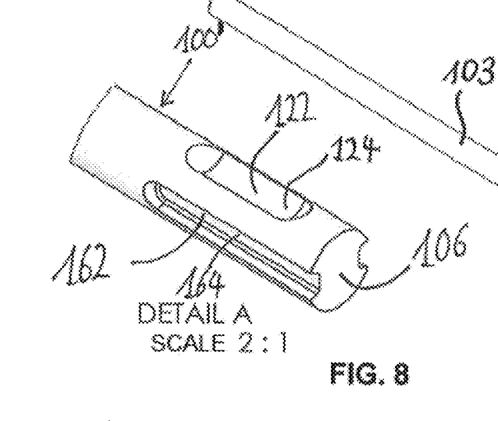
FIG. 8 shows the detail view A of the connecting element according to FIG. 3.

FIG. 8 shows detail view A of the embodiment of the connecting element 100' according to FIG. 3.

Figure 9:
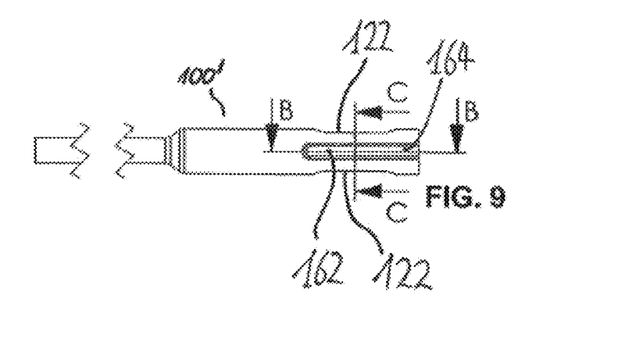
FIG. 9 shows a partial top view of the connecting element according to FIG. 3.

FIG. 9 shows a partial top view of the connecting element 100' of the embodiment according to FIG. 3.

Figure 10:
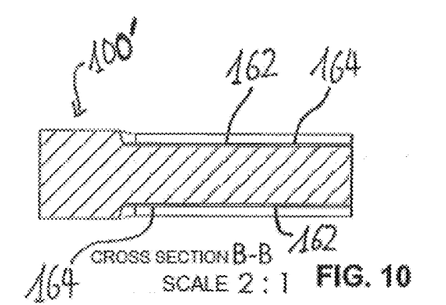
FIG. 10 shows a sectional view according to the sectional line B-B shown in FIG. 9.

FIG. 10 shows a sectional view of the connecting element 100' according to the sectional line B-B shown in FIG. 9.

Figure 11:
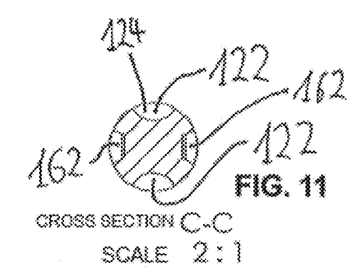
FIG. 11 shows a sectional view according to the sectional line C-C shown in FIG. 9.

FIG. 11 shows a sectional view of the connecting element 100' according to the sectional line C-C shown in FIG. 9.

Figures 12, 13:
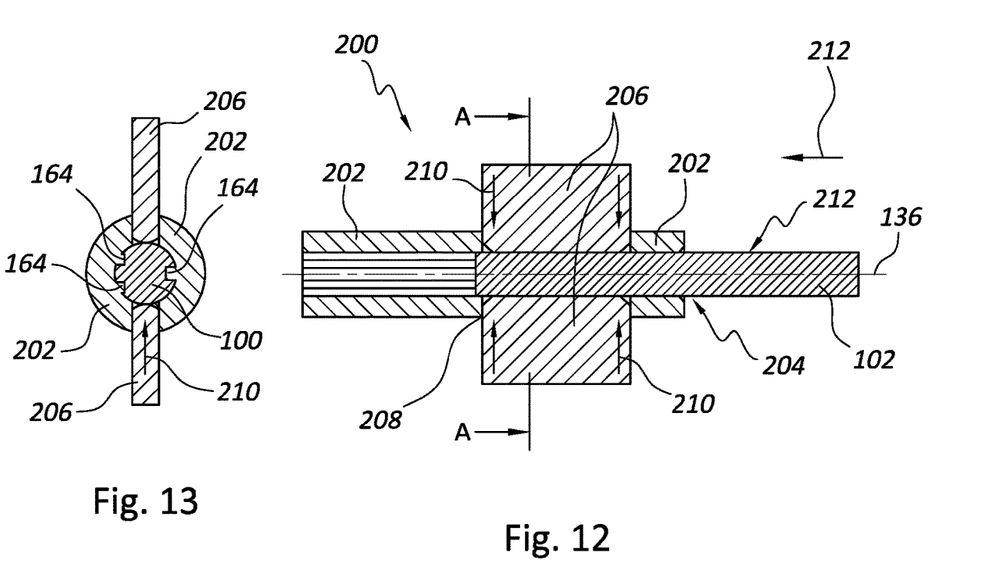
FIG. 12 shows an embodiment of an apparatus according to the invention for producing a connecting element from a semi-finished connecting element.
FIG. 13 shows a section through the apparatus of FIG. 12.

FIG. 12 shows an embodiment of an apparatus 200 according to the invention for producing a connecting element 100' according to FIGS. 3 and 8-11 from a semi-finished connecting element 102 according to FIG. 1. FIG. 13 shows a section through the apparatus 200 of FIG. 12.

For producing the connecting element 100' from the connecting element 102, the apparatus 200 has a die 202 having a longitudinal die opening for forming three rotary entrainment surfaces 164 in a semi-finished connecting element 102. The apparatus 200 shown in FIG. 12 and serving to produce a connecting element 100' from a semi-finished connecting element 102 is, for example, an apparatus 200 for producing an insertion end as part of a drill or chisel made of metal which is secured in an axially movable manner in a chuck of a hammer drill. In addition, the apparatus 200 has two radially movable forming bodies 206 which are located opposite each other and arranged in the recesses 208 of the same die 202. By means of the forming bodies 206, which according to the arrows 210 can be radially applied to the circumferential surface of the semi-finished connecting element 102, two locking depressions 124 arranged opposite each other in the semi-finished connecting element 102 can be formed or embossed, respectively, by embossing. For this purpose, the ends of the forming bodies 206, which face the circumferential surface 212 of the semi-finished connecting element 102, are rounded, as can be seen immediately, e.g., from the related sectional view according to the sectional line A-A through FIG. 12 from FIG. 13. FIG. 13 insofar shows an intermediate product already produced from the semi-finished connecting element 102, as can already be seen in the sectional view of FIG. 13, the rotary entrainment surfaces 164, which are formed by the part of the die 202 located to the right of the forming body 206 in FIG. 12. As can be seen in FIG. 13, the intermediate product 100 shown has the three rotary entrainment surfaces 164, in contrast with the two rotary entrainment surfaces 164 shown in the connecting element 100' of FIG. 3. This difference is, however, irrelevant for the present invention. Instead, this is merely nothing but an adaptation to the needs of the tool to be equipped, e.g., as the hammer drill to be equipped.

The apparatus 200 allows to perform the method according to the invention for producing a rod- or pipe-shaped connecting element 100' with an end face made from a metal semi-finished connecting element 102, in particular a drill or chisel insertion end secured in an axially movable manner in a chuck of a hammer drill. For this purpose, in a first embodiment of the method according to the invention, a semi-finished connecting element 102 is provided. Then, the three entrainment surfaces 164 visible in FIG. 10 are formed in semi-finished connecting element 102 by forcing the semi-finished connecting element 102 axially in the direction of the longitudinal axis 136 of the semi-finished connecting element into the longitudinal opening 204 of the die 202. For this purpose, according to FIG. 12, the semi-finished connecting element is inserted into the die 202 in the direction of the arrow 212. Alternatively, but not shown, the three radial entrainment surfaces 164 can also be embossed by radially applying at least one forming body that can be applied radially on the semi-finished connecting element. Subsequent to and/or during the forming of the three rotary entrainment surfaces 164, two locking depressions 124 are embossed in the semi-finished connecting element 102 and/or the intermediate product 100 by radially applying the two forming bodies 206, which are radially movable in the same die 202 according to the arrows 210.

Figure 15:
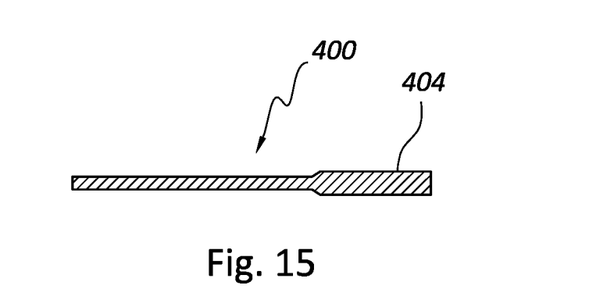
FIG. 15 shows a cross-sectional view of an interior pin taken along a longitudinal axis of an interior pin having a cylindrical shape.
Figure 16:
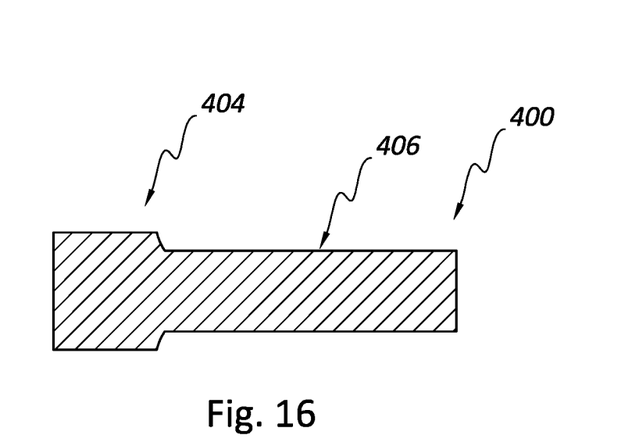
FIG. 16 shows a portion of a right end of the interior pin having an annular recess.

In another embodiment of the method according to the invention, in a pipe-shaped semi-finished connecting element 102' having an interior pipe cavity 180 with an interior pipe diameter, the interior pipe diameter can be reduced or closed in the area of the at least one planned rotary entrainment surface 164 and the at least one planned locking depression 124 by creating the rotary entrainment surface 164 and/or the locking depression 124. Preferably, prior to the inner pipe diameter being reduced or closed by creating the rotary entrainment surface 164 and/or the locking depression 124, an interior pin 400 shown in FIG. 15, which is profiled along its longitudinal axis by changes in its cross-section, is inserted in interior pipe cavity 180 in the semi-finished connecting element 102', the interior pin 400 preferably being of greater strength than the semi-finished connecting element 102'. In particular, the left end of interior pin 400 is initially inserted into the right end of interior pipe cavity 180 of element 102' and subsequently pushed into place in the interior of pipe cavity 180 so that the opposing ends of pin 400 are generally vertically aligned with the opposing ends of connecting element 102'. Pin 400 has a shape similar to the shape of interior cavity 180 of element 102' but is smaller in size than the size of interior cavity 180 so that pin 400 can be disposed in interior cavity 180. Preferably, pin 400 has one or more recessed portions radially aligned or substantially radially aligned with the planned at least one groove and/or the planned at least one rotary entrainment surface wherein the recessed portion or portions provide sufficient space between the corresponding portion or portions of the section 404 of pin 400 and the corresponding portions of section 104' of element 102' to allow the at least one rotary entrainment surface and/or the at least one groove closed at both ends to be formed in section 104' of element 102'. Referring to FIG. 16, for example, a portion of pin 400 (e.g., section 404) is shown as having an annular recess 406 that allows the at least one rotary entrainment surface and/or the at least one groove closed at both ends to be formed in section 104' of element 102' using any of the methods and/or apparatuses described herein.

Figure 17:
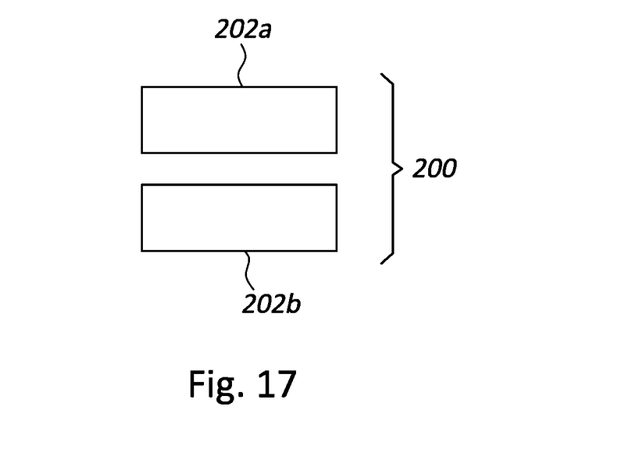
FIG. 17 is a schematic view of a die having two halves or parts.

In another embodiment of the method according to the invention, which is not shown, the die 202 can be divided at least once in its longitudinal direction, the die halves or parts having a small distance from each other relative to a diameter of the connecting element 100' during the ejection of the finished connecting element 100' from the die 202. Referring to FIG. 17, a die 202 having two die parts or halves 202a and 202b are shown.

Figure 18:
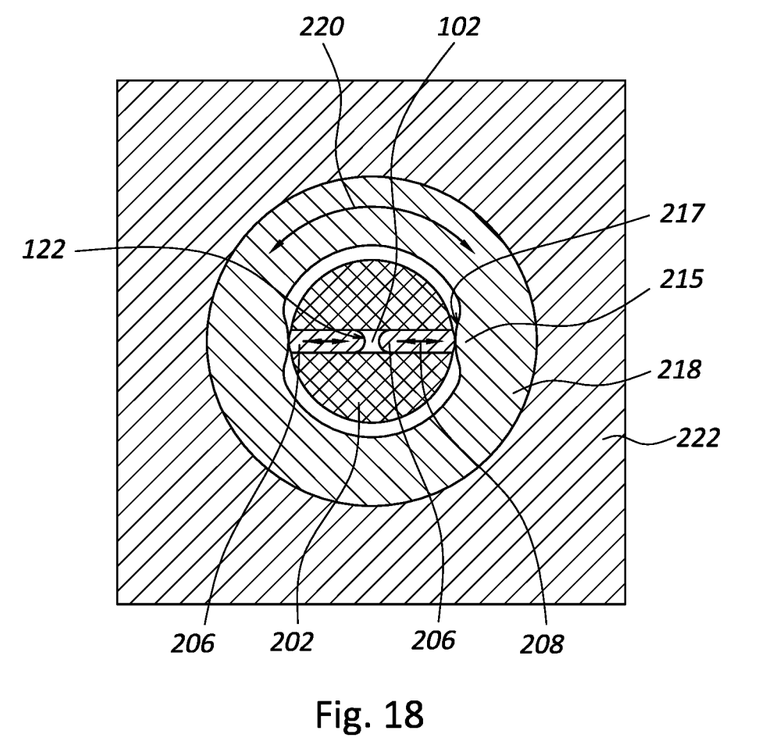
FIG. 18 shows a cross-section of an embodiment of an apparatus according to the invention for producing a connecting element from a semi-finished connecting element.

In another embodiment of the apparatus according to the invention 200, shown in FIG. 18, at least one or multiple wedges can be arranged outside of the die 202 and approximately perpendicular to the longitudinal die opening 204 that press on the at least one radially movable forming body 206 for pressing the locking grooves 124 into the semi-finished connecting element 102. In this embodiment, the at least one wedge 215 can be attached as an interior cam surface 217 within a bushing 218 rotatably supported concentrically to the die 202 in a bearing 222, the force for forming the locking depressions 124 being applied to the at least one radially movable forming body 206 by rotating the bushing 218. FIG. 14 shows a state in which the forming bodies 206 have formed the longitudinal grooves 122 closed on both sides, and retraction of the forming bodies 206 from the grooves 122 is imminent by the rotating bushing 218 according to the double arrow 220 in a corresponding manner so that the cams 217 lose contact with the ends of the forming bodies 206 facing the cams 217. Double arrow 208 indicates the movement of body 206.

The invention claimed is:

1. A method for producing a rod-shaped connecting element or pipe-shaped connecting element, which has an end face, from a semi-finished connecting element made of metal, in particular, a drill or chisel insertion end which is secured in an axially movable manner in a chuck of a hammer drill, the method comprising:
    providing a semi-finished connecting element,
    forming at least one rotary entrainment surface by forcing the semi-finished connecting element axially in the direction of the longitudinal axis of the semi-finished connecting element into a longitudinal opening of a die in the semi-finished connecting element, and
    embossing at least one locking depression in the semi-finished connecting element by radially applying at least one forming body that is movable in the same die.

2. The method according to claim 1, wherein the embossing of the at least one locking depression by radially applying at least one forming body that is movable in the die is performed subsequent to and/or during the forming of the at least one rotary entrainment surface.

3. The method according to claim 1 wherein in a pipe-shaped semi-finished connecting element, which has an interior pipe cavity with an interior pipe diameter, the interior pipe diameter is reduced or closed in the area of the at least one planned rotary entrainment surface and the at least one planned locking depression by creating the rotary entrainment surface and/or the locking depression, prior to reducing or closing the interior pipe diameter, inserting an interior pin having at least one recessed portion allowing for formation of rotary entrainment surface and/or the locking depression into the semi-finished connecting element, the interior pin being of greater strength than the semi-finished connecting element.

4. The method according to claim 1, wherein the die is divided at least once in its longitudinal direction thereby forming at least two die parts and that the die parts are at a slight distance from each other proportionate to a diameter of the connecting element during ejection.

5. A method of forming a semi-finished connecting element, in particular a semi-finished drill or chisel with at least one rotary entrainment surface and at least one locking depression, the method comprising:
    providing a semi-finished connecting element,
    forming, using a single die and at least one moveable forming body, at least one rotary entrainment surface and at least one locking depression in the semi-finished connecting element wherein the at least one locking depression is formed by embossing performed by radially applying the at least one moveable forming body to the semi-finished connecting element and the at least one rotary entrainment surface is formed by forcing the semi-finished connecting element axially into a longitudinal opening of the single die wherein the longitudinal opening is shaped to form the at least one rotary entrainment surface.

6. The method according to claim 5 wherein the at least one moveable forming body moves in a recess formed in the single die.

7. An apparatus for producing a connecting element from a semi-finished connecting element, in particular an insertion end of a drill or chisel made of metal, secured in an axially movable manner in a chuck of a hammer drill, comprising:
    a die with a longitudinal die opening for forming at least one rotary entrainment surface in the semi-finished connecting element wherein the longitudinal die opening is shaped to form the at least one rotary entrainment surface, and
    at least one forming body, at least radially movable and arranged in the at least one recess of the die by which the at least one locking depression can be formed by embossing in the semi-finished connecting element.

8. The apparatus according to claim 7, wherein outside of the die and approximately perpendicular to the longitudinal die opening, at least one wedge is arranged, the at least one wedge being configured to press on the at least one radially movable forming body for embossing the locking depressions and/or the rotary entrainment surfaces in the semi-finished connecting element.

9. The apparatus according to claim 8, wherein the at least one wedge is attached as an interior cam surface within a bushing rotatably supported concentrically to the die and that by rotating the bushing, the force for forming the locking depressions and/or rotary entrainment surfaces is applied to the at least one radially movable forming body.

10. The method according to claim 1, wherein in a pipe-shaped semi-finished connecting element, which has an interior pipe cavity with an interior pipe diameter, the interior pipe diameter is reduced or closed in the area of the at least one planned rotary entrainment surface and the at least one planned locking depression by creating the rotary entrainment surface and/or the locking depression, prior to reducing or closing the interior pipe diameter inserting an interior pin having at least one recessed portion allowing for formation of the rotary entrainment surface and/or the locking depression into the semi-finished connecting element.

11. The method according to claim 1, wherein in a pipe-shaped semi-finished connecting element, which has an interior pipe cavity with an interior pipe diameter, the interior pipe diameter is reduced or closed in the area of the at least one planned rotary entrainment surface and the at least one planned locking depression by creating the rotary entrainment surface and/or the locking depression.

* * * * *